United States Patent [19]
Chow

[11] Patent Number: 5,482,619
[45] Date of Patent: Jan. 9, 1996

[54] WATER FILTER ASSEMBLY OPERABLE TO PREVENT A JUMP CONDITION

[76] Inventor: Hong-Jien Chow, No. 27, Avenue 137, Su Yi 5th Lane, Da Ching Street, Taichung, Taiwan

[21] Appl. No.: 330,960

[22] Filed: Oct. 28, 1994

Related U.S. Application Data

[63] Continuation-in-part of Ser. No. 52,614, Apr. 27, 1993, abandoned.

[51] Int. Cl.⁶ .................................................. B01D 17/12
[52] U.S. Cl. ........................... 210/90; 210/134; 210/138; 210/143; 210/258; 210/321.69
[58] Field of Search ................................. 210/85, 86, 87, 210/90, 134, 137, 138, 139, 143, 195.2, 257.2, 258, 259, 103, 108, 321.69, 409

[56] References Cited

U.S. PATENT DOCUMENTS

| | | | |
|---|---|---|---|
| 4,160,727 | 7/1979 | Harris | 210/257.2 |
| 4,623,467 | 11/1986 | Hamlin | 210/257.2 |
| 4,801,375 | 1/1989 | Padilla | 210/257.2 |
| 4,969,991 | 11/1990 | Valadez | 210/195.2 |
| 5,096,574 | 3/1992 | Birdsong et al. | 210/90 |
| 5,427,682 | 6/1995 | Vogel et al. | 210/257.2 |

*Primary Examiner*—Joseph W. Drodge
*Attorney, Agent, or Firm*—Charles E. Baxley

[57] ABSTRACT

A water filter includes a pressure switch in order to sense inlet water pressure of the water filter, a solenoid valve for controlling water inlet of the water filter, the solenoid valve is disposed after the pressure switch and is acted in response to the pressure switch. A central processing unit is coupled to the pressure switch and the solenoid valve for delaying action of the solenoid valve in response to the pressure switch. The pump is stopped when the pressure is actuated intermittently and continuously and when the pump runs over a predetermined time interval continuously.

1 Claim, 2 Drawing Sheets

WATER FILTER ASSEMBLY OPERABLE TO PREVENT A JUMP CONDITION

The application is a continuation-in-part of application Ser. No. 08/052,614, filed Apr. 27, 1993, now abandoned.

BACKGROUND OF THE INVENTION (a) Field of the Invention

The present invention relates to a water filter assembly for drinking water.

(b) Description of the Prior Art

Various kinds of water filters have been developed and used, generally, the water filters comprise at least one filter disposed in the front portion for filtering the larger particles and at least one activated carbon filter for absorbing chemical materials; some of the water filters further comprise "ultrafiltration film" (hereinafter refer to as UF film) or "reverse osmosis film" (hereinafter refer to as RO film) disposed after the filter for filtering micro particles, such as the bacteria. The filtered particles or bacteria are accumulated on the outside of the films.

In order that the water may flow through the filter members, a pump is required to be disposed in the beginning of the water filter assembly, a solenoid valve is provided to control the water inlet of the water filter assembly, and a pressure switch is provided to sense the inlet water pressure, when the inlet water pressure is lower than a predetermined value, the solenoid valve will be closed in order to close the water inlet to the water filter assembly, and to shut off the pump. However, when the inlet water pressure is close to the predetermined value and may sometimes higher and sometimes lower than the predetermined value, the pressure switch may be opened and closed repeatedly, the solenoid valve will also be opened and closed repeatedly within a short period of time, such condition is the so-called "jump" condition; this makes a large noise during the night.

A water flow is controlled at a predetermined time interval for cleaning the accumulated particles. However, the flushing of the water is actuated whether there are accumulated particles or not. This may waste water when no particles are accumulated.

The check valves of the water filters may become failure and water leaking may be occurred in the coupling portions of the pipes, such that water may not fully pumped into the container and such that the pump will run forever or will run intermittently and continuously, the pump will thus be easily damaged, and other serious disasters will follow.

For conventional water filters, in some circumstances, the pump will not stop and will run forever such that the pump may be damaged, and other serious disasters will follow.

The present invention has arisen to mitigate and/or obviate the afore-described disadvantages of the conventional water filters.

SUMMARY OF THE INVENTION

The primary objective of the present invention is to provide a water filter assembly which includes a central processing unit for controlling the pressure switch in order to avoid the jump condition.

The other objective of the present invention is to provide a water filter assembly which includes a CPU for effectively controlling the flushing operations of the water filter.

The further objective of the present invention is to provide a water filter assembly in which the CPU may sense water leakage so as to turn off the electric power supplied to the water filter assembly and to cut off the water supplied into the water filter assembly.

The still further objective of the present invention is to provide a water filter in which the central processing unit may sense the operating time of the pump and for turning off tile pump when the pump runs continuously for a predetermined time interval.

The other objective of the present invention is to provide a water filter assembly which includes one or more sensors for sensing water leakage so as to turn off the electric power supplied to tile water filter and to cut off the water supplied into the water filter.

In accordance with one aspect of the present invention, there is provided a water filter assembly comprising a first pressure switch for sensing inlet water pressure of the water filter assembly, a solenoid valve for controlling water inlet of the water filter assembly, the first pressure switch being disposed before the solenoid valve in order to sense the inlet water pressure, the solenoid valve being activated in response to the first pressure switch, a pump for pumping water through the filter assembly assembly, a water tank, a second pressure switch for sensing water pressure in the water tank, a central processing unit coupled to the first pressure switch, the second pressure switch, the solenoid valve and the pump respectively for delaying action of the solenoid valve in response to the actuation of the first pressure switch and the second pressure switch, the central processing unit calculating working time of the first pressure switch and actuating the solenoid valve and the pump for flushing the filtering film when the working time of time filtering film reaches a predetermined time interval, the pump being stopped when the pressure switch is actuated intermittently and continuously, the central processing unit being coupled to the pump for measuring operation time of the pump and for stopping the pump when the operation time of the pump reaches a predetermined value. One or more sensors are coupled to the central processing unit and disposed below the water filter assembly in order to sense water leakage of the water filter assembly. The sensors send a signal to the control means when sensing water leakage in order to cut off electric power supplied to the water filter assembly.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
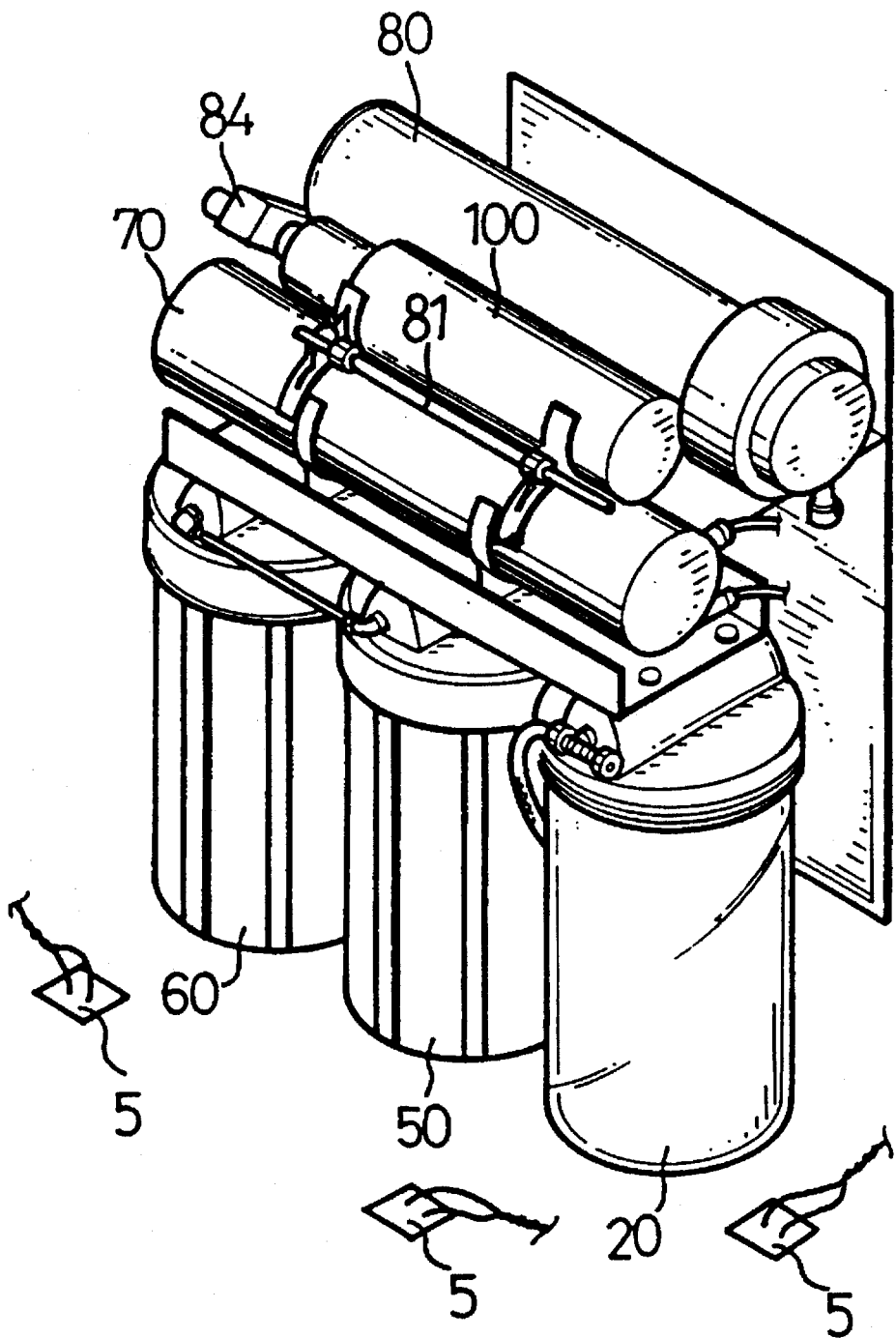
FIG. 1 is a perspective view illustrating part of a water filter assembly in accordance with the present invention.
Figure 2:
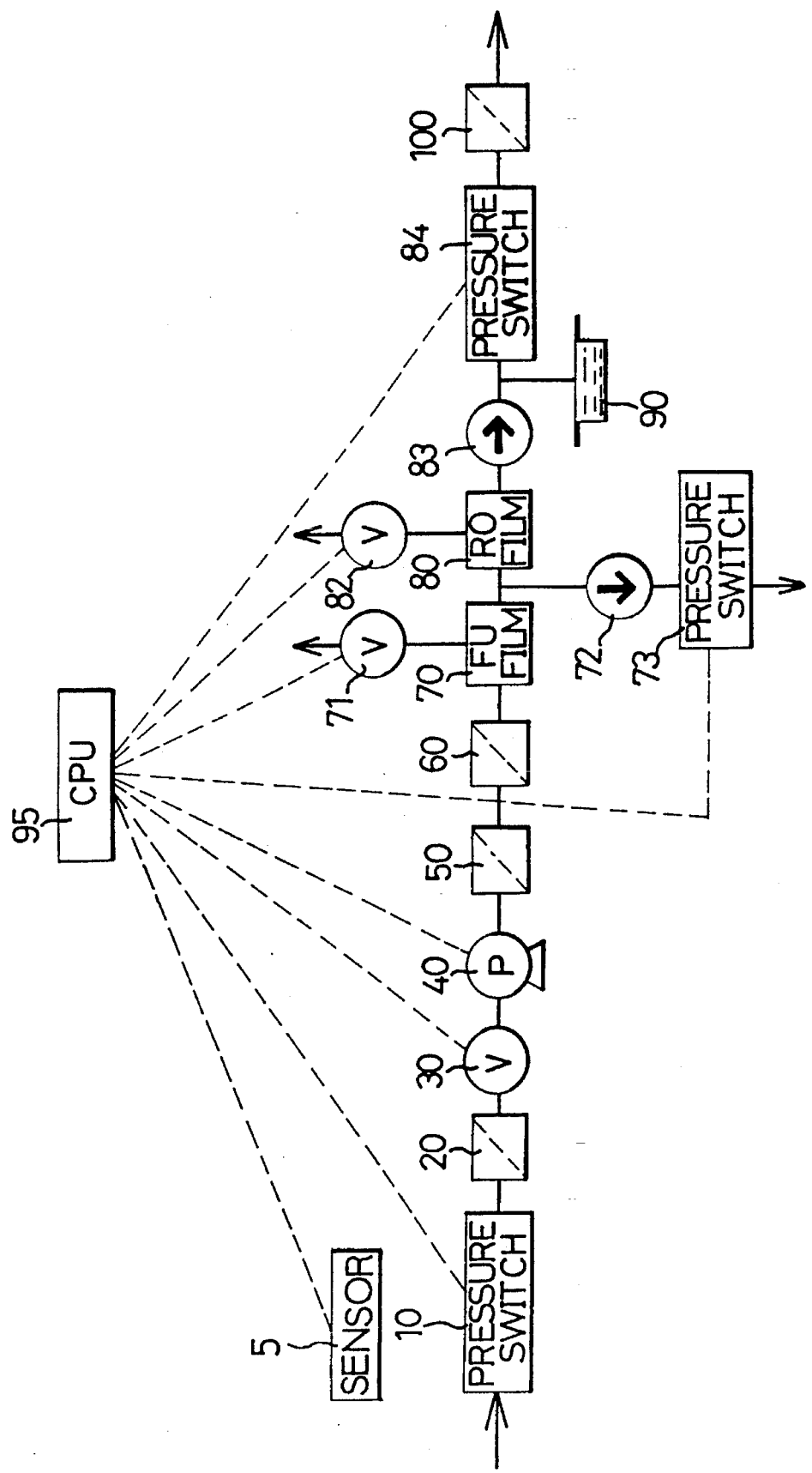
FIG. 2 is a block diagram of the water filter.

Referring to the drawings, a water filter assembly in accordance with the present invention comprises a pressure switch 10 for sensing the pressure of the inlet water, a first filter 20 for filtering larger particles, a solenoid valve 30 for controlling the flow of the water through the filter assembly, a pump 40 for pumping water through the filter assembly, an activated carbon filter 50, a second filter 60 for filtering smaller particles, a filtering film, such as a UF film 70 for filtering micro particles, such as bacteria, a solenoid valve 71 for controlling the flushing operations of the UF film 70, a check valve 72 and a pressure switch 73 coupled to the UF film 70, another filtering film, such as a RO film 80 disposed after the UF film 70, a solenoid valve 82 for controlling the flushing operations of the RO film 80, a check valve 83 and a pressure switch 84 and an activated carbon filter 100 coupled to the RO film 80, and a water tank 90 disposed after the check valve 83 for collecting filtered water.

It is to be noted that the water leaving via the solenoid valve 71 has also been filtered by the filters 20, 60 and the activated carbon filter 50, such that the water is cleaner than the water flowing into the water filter. The filtered water leaving via the check valve 72 and the pressure switch 73 is cleaner than that leaving via the solenoid valve 71. The water leaving via the solenoid valve 82 is much cleaner than the water leaving of the pressure switch 73, and the water collected in the water tank 90 and the water leaving through the activated carbon filter 100 is much cleaner than that leaving via the solenoid valve 82 and is the so called "pure water".

A central processing unit 95 is further provided and coupled to the solenoid valves 30, 71, 82, the pressure switches 73, 84, the pump 40 and the pressure switch 10. When the inlet water pressure is lower than a predetermined value, for example, 10 psi, the pressure switch 10 and thus the solenoid valve 30 have a tendency to be opened and closed repeatedly as the conventional water assembly do, however, the central processing unit 95 controls the solenoid valve 30 in order not to act right away in response to the operation of the pressure switch 10, i.e., the central processing unit 95 delays the response of the solenoid valve 30 for a predetermined period of time, for example, 1 minute, then, if the pressure switch 10 is stopped and is activated again within one minute, the solenoid valve 30 will not be activated again. However, if the pressure switch 10 starts again after one minute, the solenoid valve 30 can therefore be activated. The solenoid valve 30 thus will not be activated right away in response to the action of the pressure switch 10. No "jump" conditions will be occurred again.

The pressure switch 84 is provided to sense the water volume or the water pressure of the water tank 90, when the water volume of the water tank 90 is decreased, the pressure switch 84 may transfer a message to the central processing unit 95 in order to activate the solenoid valve 30 and to start the pump 40 in order to filter water or to "make" pure water. Similarly, the pressure switch 84 may also "jump" when the water pressure is close to a critical value, the solenoid valve 30 will also "jump" in response to the pressure switch 84. Similarly, the central processing unit 95 may also delay the responding action of the solenoid valve 30 in response to the pressure switch 84; the noise will no longer occur.

It is to be noted that the UF film 70 works for filtering purposes when the pressure switch 73 is actuated and the RO film 80 works when the pressure switch 84 is actuated, such that the working time of the films 70, 80 can be calculated by the central processing unit 95 via the pressure switches 73, 84. It is to be noted that the CPU may sense and calculate the working time of the films 70, 80. When the working time reaches a predetermined time interval, for example, one half of an hour, the solenoid valve 71 and/or the solenoid valve 82 is actuated in order to flush and clean the film 70 and/or the film 80 such that the flushing operations can be done according to the actual working time of the films. For example, the first working time of the film is 15 minutes, the second working time is 10 minutes, when the film works another 5 minutes, the solenoid 71 or 82 is actuated to do the flushing and cleaning operations.

When the pressure switches 73 or 84 are actuated intermittently and continuously, for example, when either of the pressure switches 73 or 84 is actuated and stopped for three times within three minutes, or when any of the pipe couplings have water leakage, the CPU 95 will turn off the electric power supplied to the water filter assembly, switch off the pump 40 and switch off the valve 30 in order to shut off the water supplied into the water filter assembly. Some of the warning means, such as buzzer or flash light, may be provided and coupled to the CPU in order to send out a warning signal when water leakage occurs.

The central processing unit 95 is coupled to the pump 40 and may sense the operation time of the pump, when the pump 40 continuously runs for a predetermined period of time, for example, one hour, the pump 40 will be stopped directly by the central processing unit 95. The so-called predetermined period of time is preferably equal to the time required for filling water within the water tank 90.

One or more sensors 5 are further provided and coupled to the CPU, and are provided in the lower portion of the water filter assembly in order to sense the water leaked out from the water filter assembly. When a water leaking is sensed by the sensors 5, the sensors 5 sends out a signal to the CPU 95, the CPU 95 will then turn off the electric power supplied to the water filter assembly, switch off the pump 40 and switch off the valve 30 in order to shut off the water supplied into the water filter assembly. Some of the warning means, such as buzzer or flash light, may be provided and coupled to the CPU in order to send out a warning signal when water leakage occurs.

Accordingly, the water filter assembly in accordance with the present invention includes a central processing unit for controlling the actions of the pressure switches and the solenoid valve in order to delay the response action of the solenoid valve in response to the pressure switches. The flushing operations of the water filter assembly can be controlled according to the actual working time of the films such that the films can be effectively cleaned. The CPU may sense water leakage for controlling the operation of the pump and for controlling the solenoid valve 30 in order to switch off the pump 40 and the valve 30 such that the pump 40 and the valve 30 can be prevented from damage. The pump may also be stopped when the pump 40 continuously runs for a predetermined period of time. One or more sensors are further provided for sensing water leakage in order to switch off the pump and the valve when sensing leaking.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. Apparatus comprising a water filter assembly, the assembly comprising:

a first pressure switch for sensing inlet water pressure of said water filter assembly, a first filter operative to entrap large waterborne particles and connectable in flow communication with a source of the water, a first solenoid valve for controlling flow through a water inlet of said water filter assembly, said first pressure switch being disposed before said first solenoid valve in order to sense said inlet water pressure, said first solenoid valve being activated in response to said first pressure switch, a pump coupled to said first solenoid valve for pumping water into said water filter assembly, a second filter including activated carbon material and arranged to receive first effluent from said first filter, an ultrafiltration film operative to entrap fine waterborne particles and arranged to receive second filter effluent from said second filter, a second solenoid valve coupled to said ultrafiltration film and being operative to remove said fine waterborne particles from said ultrafiltration film, a second pressure switch coupled to said ultrafiltration film for discharging third filter effluent from said ultrafiltration film, a reverse osmosis film operative to entrap micro particles and arranged to receive the third filter effluent from said ultrafiltration film, a third solenoid valve coupled to said reverse osmosis film and being operative to flush said micro particles from said reverse osmosis film, a water tank, a third pressure switch for sensing water pressure in said water tank, and a central processing unit coupled operatively to said first pressure switch and to said second pressure switch and to said third pressure switch and to said first solenoid valve and said second solenoid valve and to said third solenoid valve and to said pump; respectively; in controlling relationship therever and operative for delaying action of said first solenoid valve in response to actuation of said first pressure switch and said second pressure switch and said third pressure switch, said central processing unit being further operative to measure working time of said first pressure switch and connected operatively to actuate said first solenoid valve and said second solenoid valve and said third solenoid valve and said pump for flushing said ultrafiltration film and/or said reverse osmosis film, respectively, when working time of said ultrafiltration film and/or said reverse osmosis film, respectively, reaches a predetermined time interval, said central processing unit being further operative to stop said pump when said first pressure switch and said second pressure switch and said third pressure switch each is actuated intermittently and continuously, said central processing unit further being operative to measure operation time of said pump and for stopping said pump when said operation time of said pump teaches a predetermined value, the apparatus also comprising, at least one sensor coupled to said central processing unit and disposed below said water filter assembly in order to sense water leakage of said water filter assembly, said at least one sensor sending a signal to said central processing unit when sensing water leakage in order to cut off electric power supplied to said water filter assembly.

\* \* \* \* \*